D. S. STEWART.
ROAD GRIPPING DEVICE FOR TRACTOR WHEELS.
APPLICATION FILED FEB. 3, 1919.

1,323,654.

Patented Dec. 2, 1919.

WITNESS

T. P. Britt

INVENTOR

David S. Stewart

BY

ATTORNEYS

UNITED STATES PATENT OFFICE.

DAVID S. STEWART, OF APPLETON, WISCONSIN, ASSIGNOR TO ANTIGO TRACTOR CO., OF ANTIGO, WISCONSIN, A CORPORATION OF WISCONSIN.

ROAD-GRIPPING DEVICE FOR TRACTOR-WHEELS.

1,323,654.  Specification of Letters Patent.  Patented Dec. 2, 1919.

Application filed February 3, 1919. Serial No. 274,682.

*To all whom it may concern:*

Be it known that I, DAVID S. STEWART, a citizen of the United States, and resident of Appleton, in the county of Outagamie and State of Wisconsin, have invented certain new and useful Improvements in Road-Gripping Devices for Tractor-Wheels; and I do hereby declare that the following is a full, clear, and exact description thereof.

My invention relates to new and useful improvements in gripping devices for wheels having transversely flat tread portions such as are found on tractors, my device being of that general type embodied in Patent No. 1,232,866 issued July 10, 1917 and comprising chain sections loosely held to the tread of the wheel by members engaged with the side portions of the wheel in a manner permitting shifting movement circumferentially of the wheel upon propulsion of the vehicle whereby to dislodge mud or snow which would otherwise tend to accumulate and pack about the gripping projections in such manner as to retard the operation.

It is in general the object of my invention to improve the structure of this type of device in such manner as to effect a maximum gripping action with a minimum number of attaching parts, and in a manner permitting a most ready attachment and detachment of the device when desired.

A further object resides in the provision of a device of this character having its chain stretches so arranged as to procure an equal distribution of operating stresses on contiguous connecting members.

With the above and other objects and advantages in view, which will be apparent as the description proceeds, my invention resides in the novel features of construction, combination and arrangement of parts, as hereinafter more particularly described and defined by the appended claims.

Figure 1:
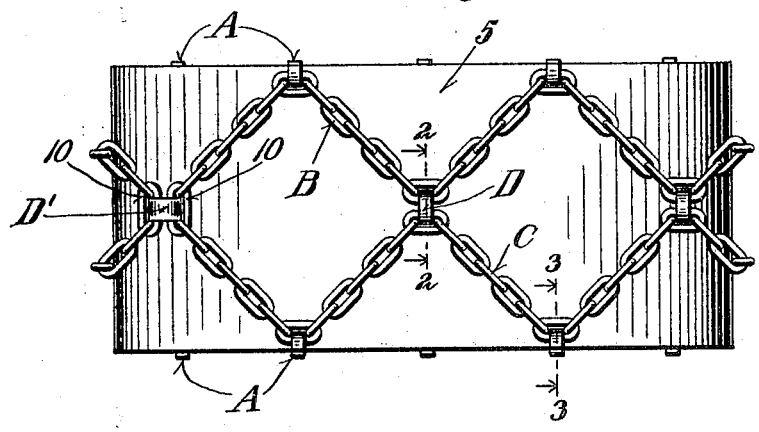
Figure 1 is a plan view of my improved gripping device applied to a tractor wheel.
Figure 2:
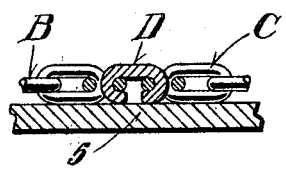
Fig. 2 is a detail sectional view showing the means for connecting the chain stretches of the device together, the plane of this figure being indicated by the line 2—2 of Fig. 1.
Figure 3:
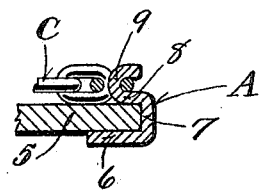
Fig. 3 is a detail sectional view on the line 3—3 of Fig. 1, showing the means for attaching the chain stretches to the wheel rim.

Referring now more particularly to the accompanying drawings, 5 designates the tread portion of a tractor or similar wheel, said tread portion being transversely flat and having side edge portions adapted to be engaged by attaching members A forming part of my device, said attaching members in the present instance comprising plates, each bent to provide a hook bill portion 6 engageable with the inner face of the tread and connected by a bight 7 which engages the edge of the tread, with a shank 8 which carries an outstanding button or head 9 adapted for hook engagement with any selected link of chain sections constituting the gripping means of my device.

I provide a pair of chain stretches B and C, these chain stretches being preferably formed by a single chain length having elongated similar links and having its ends connected in any suitable manner (not shown), and in the application of my device I connect the chain stretches together at spaced intervals by members D, each of said members D being formed from a strip of metal bent to provide an open loop adapted to receive adjacent sides of the chain links. The attaching members A have their head portions 9 engaged with the chain links midway between the connecting members D, and fasten said link to the side edge portions of the wheel tread, thus disposing the chain stretches B and C in zigzag sections extending circumferentially of the wheel tread, the connecting members of the stretches being held substantially centrally of the wheel tread, and it is noted that the angularity of the chain stretch sections is determined by the length of the chain stretch portions between the connecting members D, to thus provide for a most efficient gripping action in connection with the travel conditions involved. A connecting member D', similar to the connecting members D is used for securing the ends of the chain stretches together on the wheel, said member being engaged in terminal connecting links 10 arranged transversely of the wheel tread.

An exceedingly simple structure is thus provided which affords a maximum gripping action and which may be most readily applied to or removed from the wheel tread, it being noted that when the device is in use, the gripping stresses are distributed equally on the adjacent attaching members A.

What is claimed is:

1. The combination with a wheel rim, of a pair of chain stretches arranged circumferentially on the wheel rim, means connecting spaced portions of said stretches together at substantially the central portion of the rim, and means for connecting portions of said stretches between said connecting means with the edge portions of the wheel to dispose said stretches in zigzag sections extending circumferentially of the wheel.

2. A gripping device for wheel rims comprising chain stretches formed of elongated links, open loops adapted to receive adjacent sides of chain links of the stretches to connect said stretches at spaced intervals, and members engageable with the stretches between said first named members for securing the stretches to the edge portions of the wheel rim.

In testimony that I claim the foregoing I have hereunto set my hand at Milwaukee, in the county of Milwaukee and State of Wisconsin.

DAVID S. STEWART.